Aug. 25, 1942.   G. A. CHADBOURNE   2,294,281
MOWING MACHINE
Filed Sept. 18, 1941
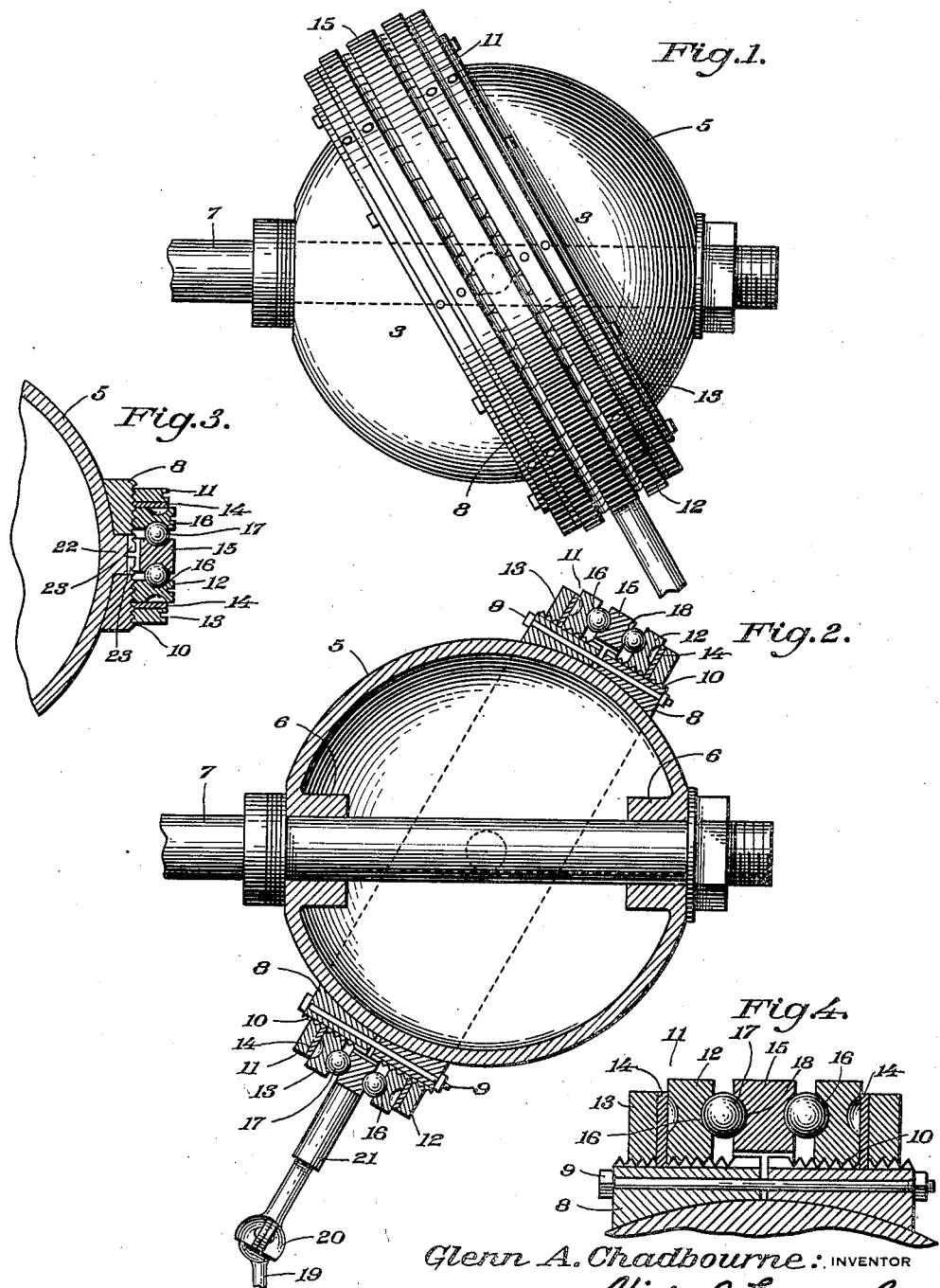
Glenn A. Chadbourne, INVENTOR
BY Victor J. Evans & Co.
ATTORNEYS Patented Aug. 25, 1942

2,294,281

UNITED STATES PATENT OFFICE 2,294,281

MOWING MACHINE

Glenn A. Chadbourne, Livingston, Mont.

Application September 18, 1941, Serial No. 411,421

3 Claims. (Cl. 74—60)

My invention relates to means for converting rotary movement into reciprocating movement and more particularly to means for reciprocating the sickle or knife bar of a mowing machine from a shaft of said machine and constitutes an improvement over United States Letters Patent No. 1,880,121, granted to me on September 27, 1932.

One of the principal objects of my invention is to provide a device of the above described character so constructed and arranged whereby the sickle bar of a mowing machine can be reciprocated while in a horizontal position or in various positions at an incline to the horizontal.

An important object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a top plan view of my invention.

Figure 2 is a vertical sectional view thereof, the parts being rotated approximately 180 degrees with respect to Figure 1.

Figure 3 is a detail sectional view taken on a line 3—3 of Figure 1.

Figure 4 is a fragmentary detail vertical sectional view of the ball and illustrating the parts on an enlarged scale.

As illustrated in the drawing, I provide a hollow ball or sphere 5 formed with an oppositely disposed inwardly extending pair of bearings 6, the latter having extending therethrough a drive shaft 7 to which the ball 5 is fixed for rotation therewith.

The ball has mounted thereon a pair of collars 8, the latter being connected together by bolts and nuts 9, which serve to securely clamp said collars about said ball against relative movement. The collars extend about the ball at an angle with respect to the axis of the shaft 7. The outer circumferential faces of the collars are provided with threads 10 and have threaded thereon spaced pairs of ring assemblies 11, each pair comprising an inner and outer rings 12 and 13 respectively and between which is interposed shims, one of which is indicated at 14. Arranged between the ring assemblies 11, there is provided a circular yoke 15 moveable with respect to the collars and ring assemblies.

The inner rings 12 have their side faces formed with raceways 16 receiving ball bearings 17 mounted in similar raceways 18 formed in the side faces of the yoke 15 as clearly illustrated in Figure 4. The yoke 15 is connected to the outer end of an arm 19 carried by the knife bar (not shown) of the mowing machine (not shown) through the medium of an universal joint 20 and a slip connection 21 so that the knife bar will be reciprocated by the movement of the yoke 15.

The ball is provided on its outer face with a pair of oppositely disposed trunnions 22 having their axes disposed in a plane right angularly related to the axis of a shaft 7. The oppositely disposed side faces of the collars 8 are formed with pairs of recesses 23 receiving the trunnions 22. Obviously, by loosening the nuts and bolts 9, the collars 8 may be pivotally adjusted about the trunnions 22 whereby to vary the reciprocating stroke of the knife bar.

From the foregoing, it will be apparent that upon rotation of the shaft 7, the rotating movement thereof will be converted into a reciprocating movement for operating the knife bar through the medium of the ring assemblies and yoke. Wear on the inner rings 12, yoke 15 and ball bearings 17 may be compensated for by inserting shims between the inner and outer rings.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefore as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. A mowing machine sickle bar actuating movement comprising a drive shaft having a ball secured thereto, two collars having inner faces clamped against said ball in parallel planes at an angle to the axis of said shaft, rings respectively threadedly connected with said collars, an annular yoke loosely encircling said two collars between said rings, said yoke being adapted for connection with a sickle bar, and roller elements between the yoke and the respective rings.

2. A mowing machine sickle bar actuating movement comprising a drive shaft having a ball secured thereto, two collars having inner faces clamped against said ball in parallel planes at an angle to the axis of said shaft, rings respectively threadedly connected with said collars, an annular yoke loosely encircling said two collars between said rings, said yoke being adapted for connection with a sickle bar, roller elements between the yoke and the respective rings, and companion rings threadedly connected with the respective collars lying against the respective first-mentioned rings on their sides opposite said roller elements.

3. A mowing machine sickle bar actuating movement comprising a drive shaft having a ball secured thereto, two collars having inner faces clamped against said ball in parallel planes at an angle to the axis of said shaft, rings respectively threadedly connected with said collars, an annular yoke loosely encircling said two collars between said rings, said yoke being adapted for connection with a sickle bar, roller elements between the yoke and the respective rings, and trunnions on said ball at diametrically opposite points, said collars being pivotally movable about said trunnions when unclamped from said ball to vary the angularity of the collars with respect to the axis of said shaft.

GLENN A. CHADBOURNE.